United States Patent [19]
Lenz

[11] 3,988,947
[45] Nov. 2, 1976

[54] COILED FLYWHEEL ASSEMBLY

[75] Inventor: John Lenz, Coon Rapids, Minn.

[73] Assignee: Havir Manufacturing Company, St. Paul, Minn.

[22] Filed: June 9, 1975

[21] Appl. No.: 585,453

[52] U.S. Cl. ............................................... 74/572
[51] Int. Cl.² ...................................... F16C 15/00
[58] Field of Search ...................................... 74/572

[56] References Cited
UNITED STATES PATENTS

| | | | |
|---|---|---|---|
| 1,165,919 | 12/1915 | Turner | 74/572 |
| 1,264,642 | 4/1918 | Harley | 74/572 |
| 3,296,886 | 1/1967 | Reinhart, Jr. | 74/572 |

FOREIGN PATENTS OR APPLICATIONS

| | | | |
|---|---|---|---|
| 396,257 | 5/1923 | Germany | 74/572 |

Primary Examiner—Samuel Scott
Assistant Examiner—F. D. Shoemaker
Attorney, Agent, or Firm—James R. Cwayna

[57] ABSTRACT

A flywheel for use with tools such as punch presses and the like which includes a substantially flat mounting plate with means for mounting the plate to the machine upon which the wheel will be used and providing the flat plate with a strip of material about the periphery thereof which material strip is formed from coiling or winding strip stock to the proper dimension for attachment to the periphery of the wheel through welding or the like.

6 Claims, 5 Drawing Figures

U.S. Patent  Nov. 2, 1976  3,988,947
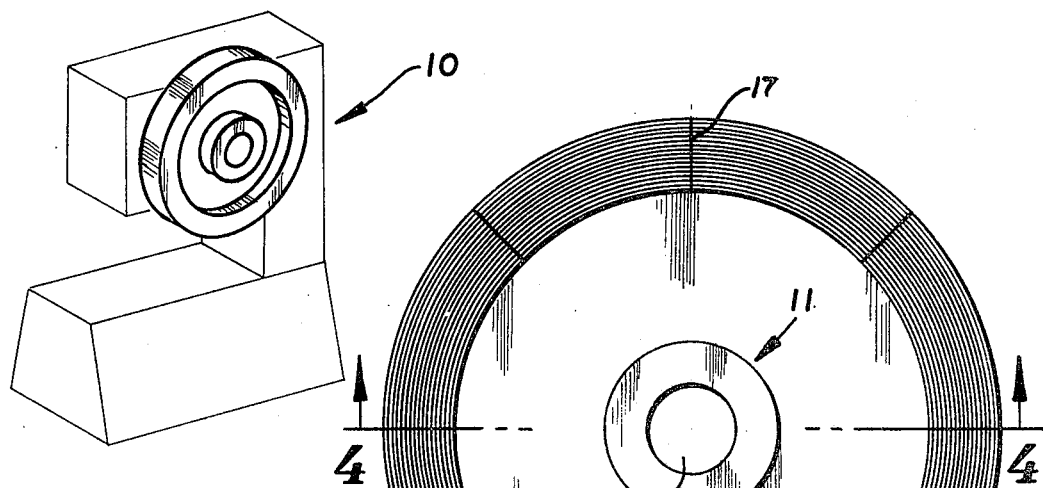
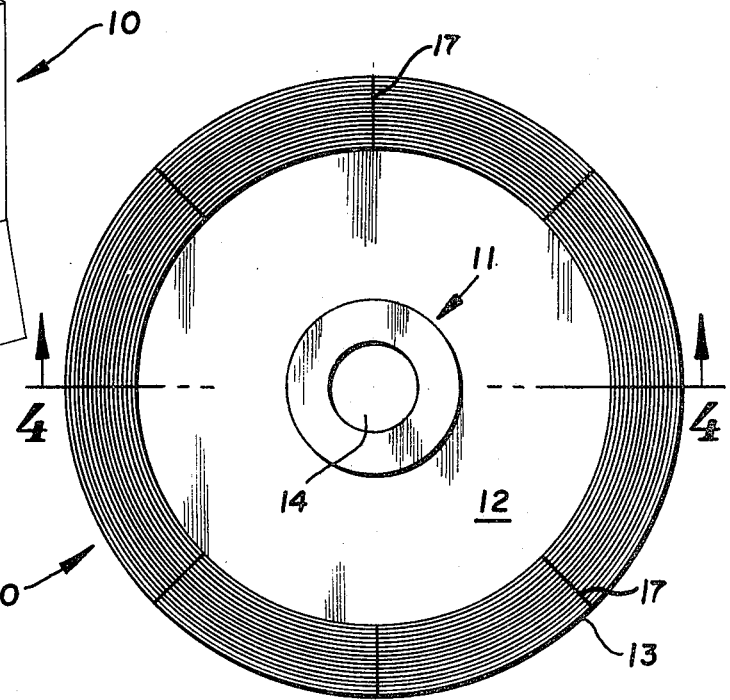
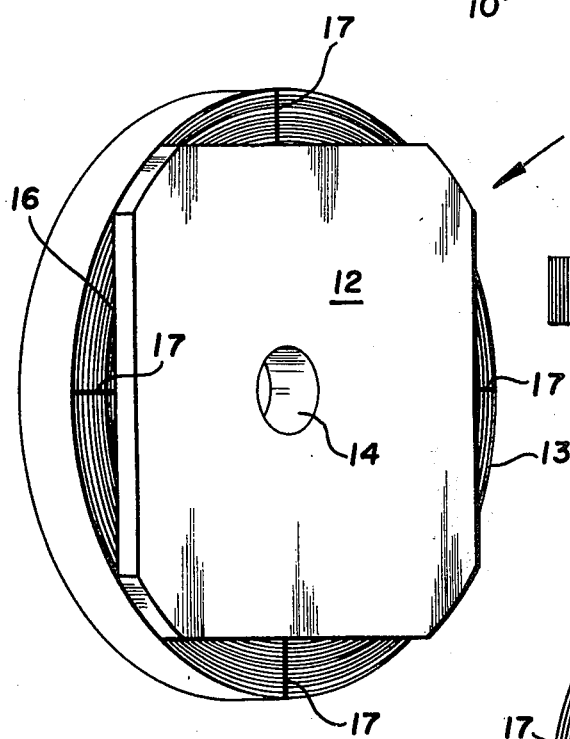
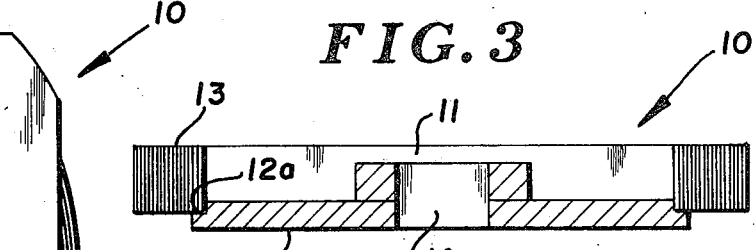
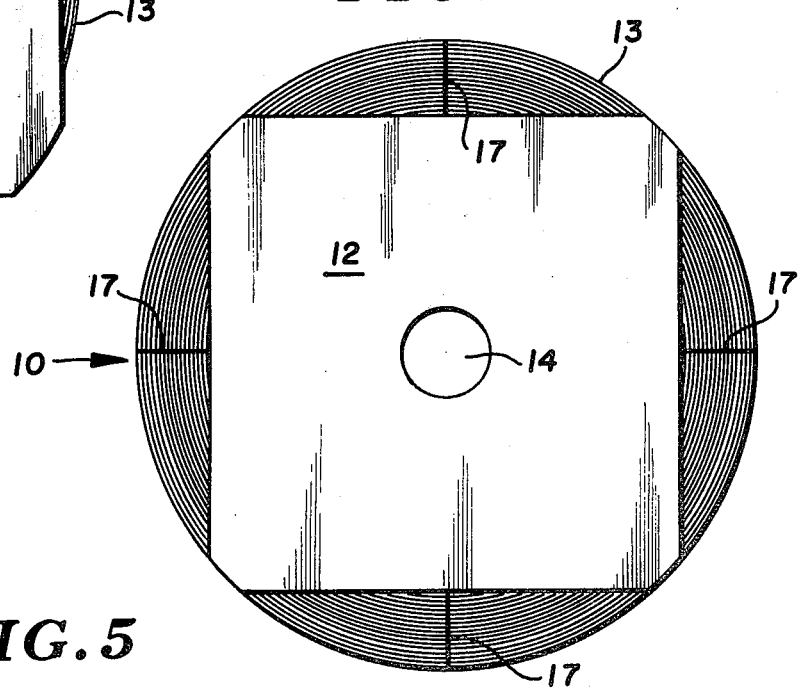

COILED FLYWHEEL ASSEMBLY

FIELD OF THE INVENTION

This invention relates generally to the construction of flywheels and more particularly to a flywheel constructed from a coiled strip of material attached to a flat plate.

BACKGROUND AND OBJECTS OF THE INVENTION

As generally known in the art, flywheels are customarily cast and machined thereafter. When utilizing flywheels of a size normally associated with large punch presses and the like, the cost of casting and the required machining is very high. Cast flywheels, besides this cost consideration will sometimes explode or rupture when operated at high speeds.

Through this invention, applicant provides a means for constructing a flywheel without using the casting process and rather provides a means for fabricating a flywheel by simply using a flat plate with a coiled strip either wound directly thereon and permanently secured thereto or wound separately therefrom and subsequently attached thereto.

With applicant's concept, a continuous strip of substantially thin material may be formed into a tight coil and thereafter this coiled material is secured to the support and bearing plate. This structure will allow a greater mass of material to form the rim of the wheel as compared to the casting process wherein the wheel is normally and must be designed for proper strength to support the rim which results in a disproportionate amount of material being located at the inner radiuses of the wheel rather than at the rim. The wheel that is able to position the greatest amount of its weight at the outer radiuses thereof is the most effective wheel.

It is therefore an object of applicant's invention to provide a flywheel which is fabricated from a flat sheet of material and having the rim thereof formed from a rolled or coiled strip of material.

It is a further object of applicant's invention to provide a flywheel wherein the rim thereof is provided from a continuous strip of relatively thin material wound into a tight coil and thereafter secured to the periphery of the bearing and mounting portion of the wheel.

It is still a further object of applicant's invention to provide a flywheel wherein the mass of the wheel may be properly positioned about the periphery thereof and the interior supporting structure is maintained at a proper low mass and weight factor.

These and other objects and advantages of applicant's invention will more fully appear from the accompanying disclosure made in connection with the accompanying drawings, wherein the same numeral is utilized to designate the same or similar parts throughout the several views, and in which:

FIG. 1 is a perspective view of a tool such as a punch press having a flywheel embodying the concepts of applicant's invention thereon;

FIG. 2 is a perspective view of a flywheel embodying the concepts of applicant's invention;

FIG. 3 is a side view of applicant's flywheel;

FIG. 4 is a section taken substantially along Line 4—4 of FIG. 3; and,

FIG. 5 is a side view of applicant's flywheel taken from the side opposite to FIG. 3.

In accordance with the accompanying drawings, applicant's flywheel is generally designated 10 and basically consists of a hub 11, a support plate or more generally, a radially extending support member 12 and a rim 13.

Hub section 11 may include a longitudinally extending shaft receiving member having a shaft receiving passage 14 extending therethrough. Obviously, the purpose of this passage and hub is to permit attachment of the wheel 10 to the machine upon which it is desired and various mounting members may be provided for use with this hub to insure and provide the necessary attachment.

The radially extending section 12, in the form shown, consists of a generally rectangular plate member having a passage corresponding to the hub passage extending therethrough and having the hub 11 positively secured thereto. This support member is illustrated as being a substantially flat and continuous member having its outstanding corners machined to a radius. The major consideration of this support plate is to provide a supporting member of sufficient strength to perform its function which is to properly hold the rim 13 of the wheel. In order to perform this function with a minimum of labor, the plate has been shown as being continuous but it should be obvious that this plate could consist of a plurality of radially extending struts, which struts would provide sufficient mounting area for proper attachment of the rim thereto.

As illustrated in FIG. 4, plate 12 could be machined on one side thereof as at 12a to provide a locating shoulder for the rim that is to be mounted thereon. This shoulder 12a could be provided by machining or could be provided by locating a plurality of locating elements in the proper radial and arcuate locations on one side of plate 12. Obviously when considering the cost factors of producing this wheel, such operations would increase this cost.

The rim portion 13 is attached at a proper radial location to the support plate 12. This rim portion is provided by rolling or coiling a continuous strip of a thin material and after such forming the plate or web section 12 is properly positioned relative thereto and the two sections are welded or otherwise positively joined about the dimensions of the plate that permit such welding. For example the plate and rim could be welded along four sides of the plate as at 16. This welding could also be on the interior of the coiled rim. In addition to this joining of the plate or web and the rim, the individual coiled strips could be selectively joined to one another by welding the same at radially selected locations such as 45° and 90° as indicated by the numeral 17 in FIGS. 2, 3 and 5.

Various cast wheels perform as a gong and are often noisy even during their rotation. Applicant's design provides a wheel which will substantially deaden any such noise factor. Cast flywheels, due to stresses accumulated during casting, will sometimes shatter or explode, particularly when operated at high speeds. Applicant has provided a wheel that, due to the various materials available and the treatment of the same will substantially lessen this possibility.

Obviously in the design of applicant's flywheel the factors of weight, strength and the like must be taken into consideration. An obvious advantage of applicant's design, is the ability to concentrate a maximum amount of weight on the rim portion thereof. When utilizing a cast wheel, any weight increase will also demand that the web be substantially increased, this being due to the inherent relative strength of cast material versus that of rolled steel as used by applicant in his web.

It should be obvious that applicant has provided a unique design for a flywheel which includes a web member of a relatively thin cross section and a rim member which is formed of a coil of relatively thin material with the two being joined into a unit.

What I claim is:
1. A flywheel construction including;
   a. a generally centrally arranged hub portion adapted for mounting the wheel;
   b. a radially extending support web, said support web including a substantially rectangular flat plate, being secured to said hub; and
   c. a rim portion comprising a coiled strip of material being secured to said support web adjacent the radial outer periphery of said plate.

2. The structure as set forth in claim 1, and said plate being provided with radially positioned rim locating means arranged to engage the inner diameter of said rim.

3. The structure as set forth in claim 2, and said rim locating means including shoulder means formed in said plate.

4. The structure set forth in claim 1, and said rim portion comprising a rolled strip of relatively thin material having a plurality of rolled layers, to provide a rim of desired weight.

5. The structure set forth in claim 4, and said layers of said rolled strip being secured to one another.

6. The structure set forth in claim 1 and said web being square and of a dimension less than the outer diameter of said rim, said web being secured to said rim on at least the sides thereof.

* * * * *